United States Patent
Suzuki

(12) United States Patent     (10) Patent No.: US 7,237,588 B2
Suzuki     (45) Date of Patent: Jul. 3, 2007

(54) PNEUMATIC TIRE INCLUDING ZIGZAG SIPES

(75) Inventor: Kazuya Suzuki, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 95 days.

(21) Appl. No.: 10/940,801

(22) Filed: Sep. 15, 2004

(65) Prior Publication Data

US 2005/0103414 A1    May 19, 2005

(30) Foreign Application Priority Data

Nov. 13, 2003   (JP)  ............... 2003-384105

(51) Int. Cl.
    *B60C 1/00*    (2006.01)
    *B60C 11/00*    (2006.01)
    *B60C 11/12*    (2006.01)

(52) U.S. Cl. ............... 152/209.5; 152/209.18; 152/209.22; 152/902; 152/DIG. 3

(58) Field of Classification Search ............ 152/209.5, 152/209.18, 209.22, 902, DIG. 3
See application file for complete search history.

(56) References Cited

U.S. PATENT DOCUMENTS 5,176,765 A * 1/1993 Yamaguchi et al. ... 152/DIG. 3
5,833,779 A * 11/1998 van der Meer et al. ............ 152/DIG. 3

FOREIGN PATENT DOCUMENTS

| EP | 881103 | * | 12/1998 |
|---|---|---|---|
| EP | 1 428 688 A2 | | 6/2004 |
| JP | 62-241710 | * | 10/1987 |
| JP | 2-95903 | * | 4/1990 |
| JP | 2-128907 | * | 5/1990 |
| JP | 03-038409 | * | 2/1991 |
| JP | 3-169723 | * | 7/1991 |
| JP | 2000-326707 A | | 11/2000 |
| JP | 2001-105808 A | | 4/2001 |
| JP | 2002-29226 A | | 1/2002 |
| JP | 2002-274126 A | | 9/2002 |

* cited by examiner

*Primary Examiner*—Steven D. Maki
(74) *Attorney, Agent, or Firm*—Birch, Stewart, Kolasch & Birch, LLP

(57) ABSTRACT

A pneumatic tire includes a tread portion provided in a tread face thereof with tread elements each provided with at least one zigzag sipe, a cap tread rubber defining the tread face, and a base tread rubber disposed radially inside the cap tread rubber, wherein the zigzag sipe comprises zigzag segments which are alternating circumferentially-oriented segments and an amplitude center line of zigzag of the zigzag sipe is inclined at an angle (theta) of from 0 to 45 degrees with respect to the tire circumferential direction, and the zigzag sipe has a bottom including alternating deep parts and shallow parts in comparison with the level of the boundary between the cap tread rubber and base tread rubber.

14 Claims, 4 Drawing Sheets axial direction

PNEUMATIC TIRE INCLUDING ZIGZAG SIPES

This Nonprovisional application claims priority under 35 U.S.C. § 119(a) on Patent Application No(s). 2003-384105 filed in Japan on Nov. 13, 2003, the entire contents of which are hereby incorporated by reference.

BACKGROUND OF THE INVENTION

The present invention relates to a pneumatic tire, more particularly to a tread structure comprising siped tread elements capable of improving on-the-ice tire performance and uneven tread wear resistance.

In general, winter tires such as snow tire and studless tire are provided in the tread portion with a tread pattern comprising a number of siped blocks, and the sipes are oriented axially of the tire for the purpose of deriving a maximum driving force (traction) and a maximum braking force from their edges (so called edge effect).

In such a block pattern tire, however, during running on icy roads, cornering power becomes insufficient in comparison with the driving force. Therefore, the steering stability is not so good during straight running as well as cornering. Thus, on the whole, there is room for improvement in ice performance. Further, as the block which is provided with axially oriented sipes (a) as shown in FIG. 7 is greatly decreased in circumferential rigidity, so called heel-and-toe wear—uneven wear between the circumferentially opposite edges of the block—is caused. This is especially remarkable in winter tires wherein a relatively soft rubber compound is used in the tread portion.

SUMMARY OF THE INVENTION

It is therefore an object of the present invention to provide a pneumatic tire, in which uneven tread wear such as heel-and-toe wear and on-the-ice tire performance can be improved.

According to the present invention, a pneumatic tire comprises a tread portion provided in a tread face thereof with tread elements each provided with at least one zigzag sipe, a cap tread rubber defining the tread face, and a base tread rubber disposed radially inside the cap tread rubber, the zigzag sipe comprising zigzag segments which are alternate circumferentially-oriented segments and axially-oriented segments, the amplitude center line of zigzag of the zigzag sipe being inclined at an angle (theta) of from 0 to 45 degrees with respect to the tire circumferential direction, and the zigzag sipe having a bottom including alternating deep parts and shallow parts in comparison with the level of the boundary between the cap tread rubber and base tread rubber.

By providing such zigzag sipes, as the circumferential components of the edges of the sipes are increased, the cornering power is increased due to their circumferential edge effect, and thereby steering stability on the icy roads can be improved during straight running as well as cornering.

Here, the sipe is, as well known in the art, a cut or very narrow groove having a groove width of less than 1.5 mm, usually less than 1.0 mm. The tread element is a ground contacting part defined by tread grooves having a width of more than 1.5 mm, usually more than about 3.0 mm.

BRIEF DESCRIPTION OF THE DRAWINGS

Embodiments of the present invention will now be described in detail in conjunction with the accompanying drawings.

DETAILED DESCRIPTION OF THE INVENTION

Figure 1:
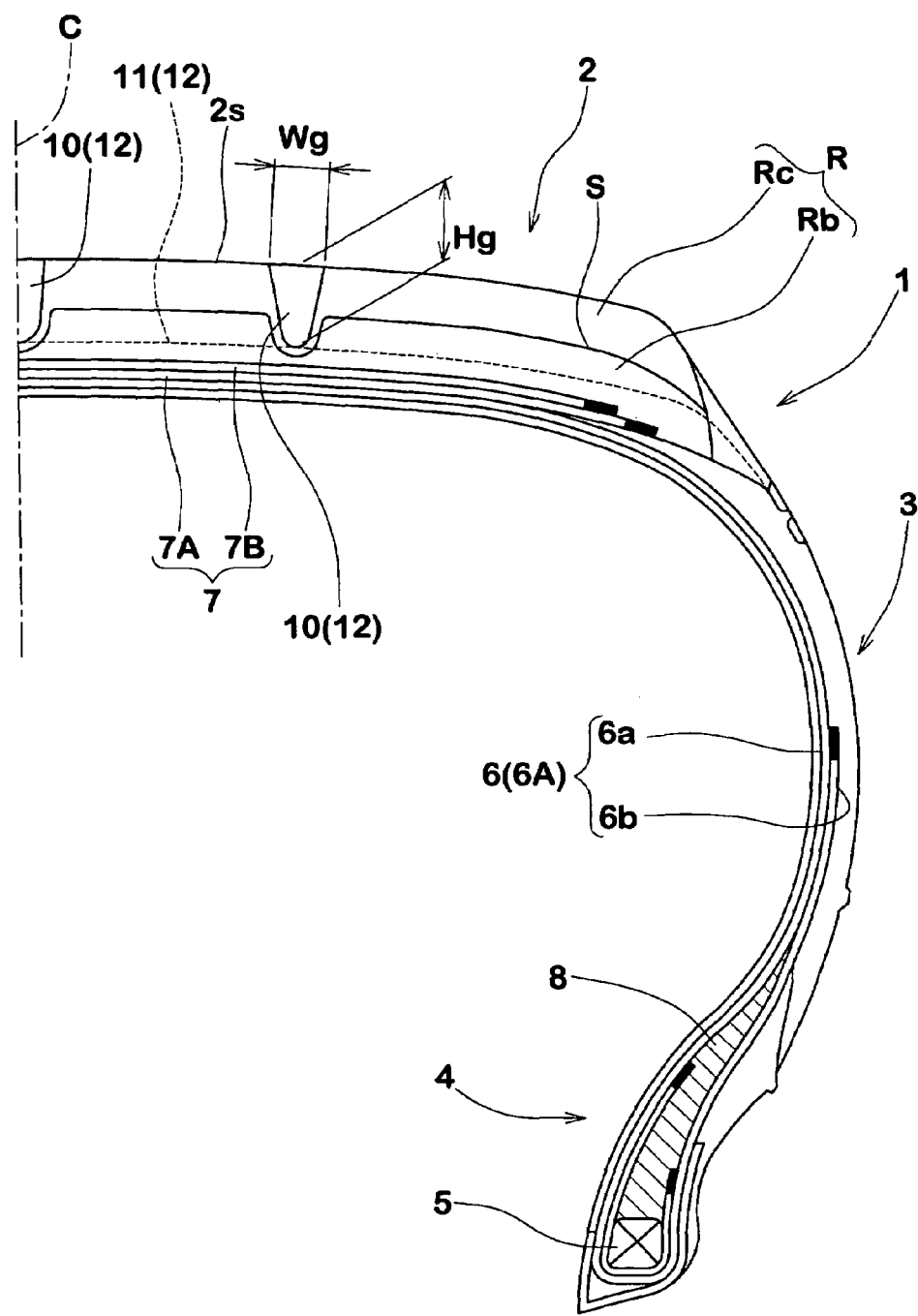
FIG. 1 is a cross sectional view of a pneumatic tire according to the present invention.

In the drawings, pneumatic tire 1 according to the present invention comprises a tread portion 2, a pair of sidewall portions 3, a pair of bead portions 4 each with a bead core 5 therein, a carcass 6 extending between the bead portions 4, and a belt 7 disposed radially outside the carcass 6 in the tread portion 2. In this embodiment, the pneumatic tire 1 is a studless tire for passenger cars.

The carcass 6 comprises at least one radial ply 6A of cords arranged radially at an angle of from 70 to 90 degrees with respect to the tire equator, and extending between the bead portions 4 through the tread portion 2 and sidewall portions 3, and turned up around the bead core 5 in each of the bead portions from the inside to the outside of the tire so as to from a pair of turned up portions 6b and a main portion 6a therebetween. In this example, the carcass 6 is composed of a single ply 6A.

Between the main portion 6a and turned up portion 6b in each of the bead portions, a bead apex rubber 8 is disposed so as to extend radially outwardly from the bead core 5.

The belt 7 comprises at least two cross breaker plies 7A and 7B each made of parallel cords laid at an angle of from 10 to 35 degrees with respect to the tire equator.

In the tread portion 2, a tread rubber R is disposed radially outside the belt 7, and tread grooves 12 are formed so as to divide the tread portion 2 (tread rubber) into a plurality of tread elements such as blocks B and rib.

The tread rubber R comprises two layers of a radially outermost cap tread rubber Rc and a radially inner base tread rubber Rb. The cap tread rubber RC extends over the tread portion, defining the tread face 2s. The base tread rubber Rb is disposed on the belt 7 and abuts on the cap tread rubber RC, forming a boundary S therebetween. In this embodiment, a relatively soft rubber having a hardness HC of from 40 to 50 degrees is used as the cap tread rubber RC in order to increase the adhesive frictional force between the tread face 2s and icy road to thereby improve on-the-ice performance. On the other hand, in order to minimize decrease in the tread pattern rigidity, namely, overall rigidity of the tread elements such as blocks and ribs, due to the softer cap tread rubber RC, a relatively hard rubber having a hardness Hb more than the above-mentioned hardness HC is used as the base tread rubber Rb. The hardness Hb is set in the range of from 45 to 60 degrees, and the difference (Hb–Hc) from the hardness HC is set in the range of from 3 to 15 degrees.

Here, the hardness HC, Hb is measured at a temperature of 23 plus/minus 2 degrees c with a type-A durometer according to Japanese Industrial Standard K6253.

Even if the hardness HC is increased over 50 degrees, a further improvement in the adhesive frictional force can not be obtained. If the hardness Hc is less than 40 degrees on the other hand, the tread wear resistance greatly decreases.

If the hardness difference (Hb–Hc) is less than 3 degrees, it becomes difficult to maintain the required tread pattern rigidity. If (Hb–Hc) is more than 15 degrees, then between the cap tread rubber Rc and base tread rubber Rb, the difference in deformation of the tread rubber due to external force becomes increased, and as a result, the rolling resistance tends to increase to deteriorate fuel consumption performance.

In this embodiment, the tread grooves 12 include main circumferential grooves 10 extending continuously in the tire circumferential direction, and main axial grooves 11 extending across the overall width of the tread portion. From a point of view of snow performance, it is preferable, in case of passenger car tires, that the tread groove 12 has a width Wg of from 4 to 10 mm and a depth Hg of 8 to 12 mm in order to increase shear strength of the trodden snow in the tread grooves and thereby to improve the snow grip performance.

Figure 2:
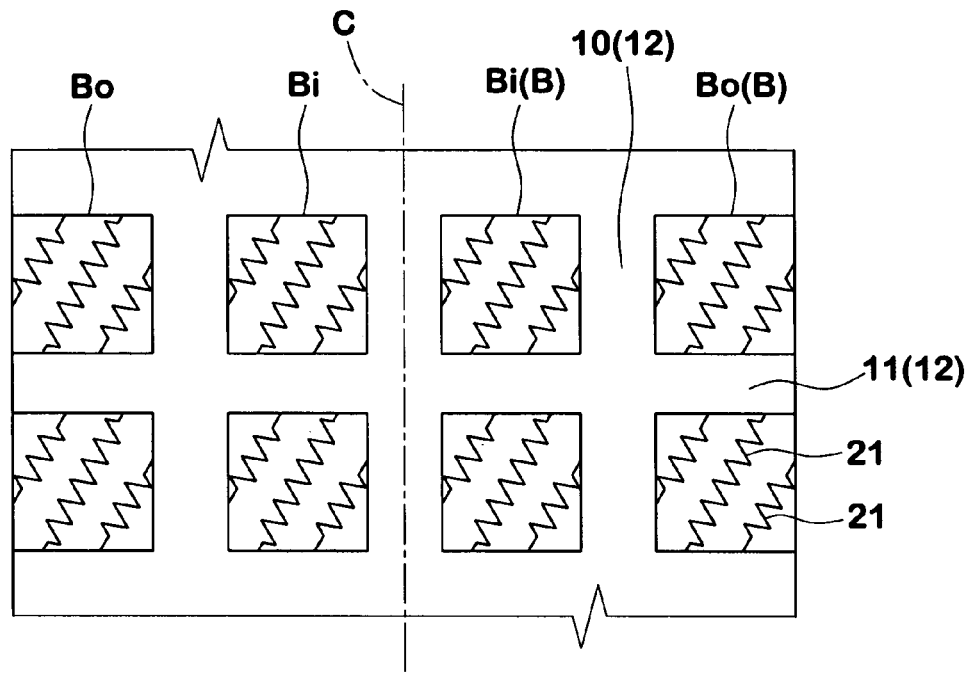
FIG. 2 is a partial developed view of the tread portion showing a block pattern.
Figure 6:
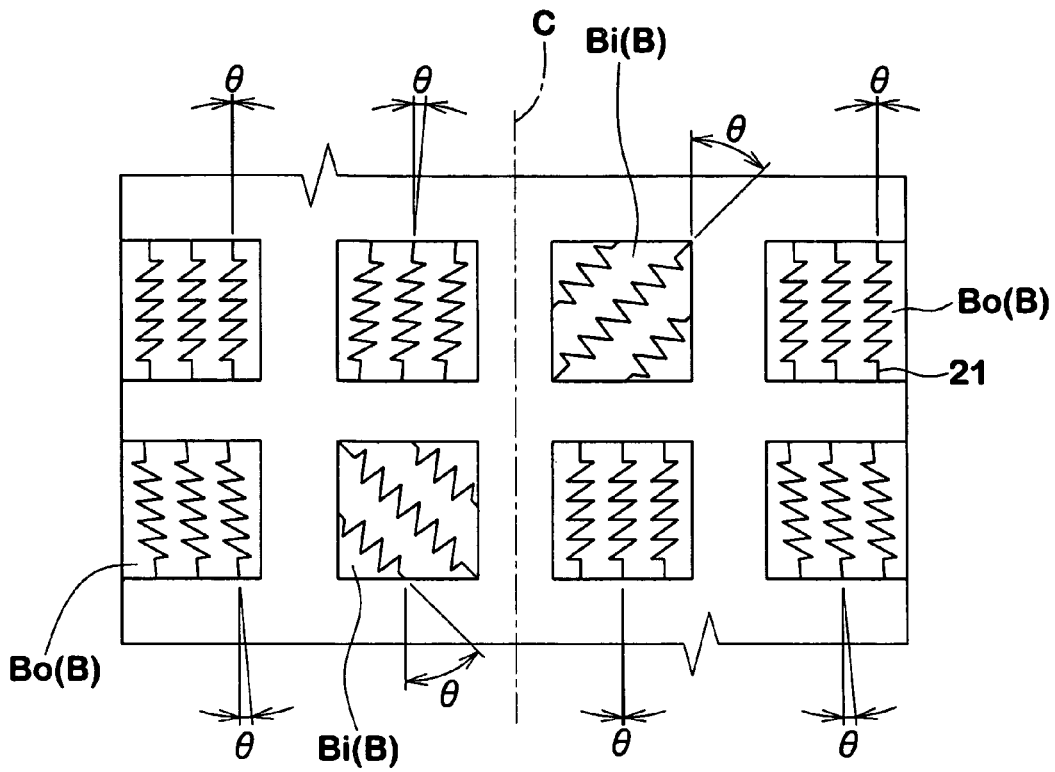
FIG. 6 is a partial developed view similar to FIG. 2 showing another example of the block pattern.

In the examples shown in FIGS. 2 and 6, the main circumferential grooves 10 are straight and parallel with the tire circumferential direction, and the main axial grooves 11 are also straight and extend across the overall width of the tread portion in parallel with the tire axial direction.

The tread portion 2 is divided by the three main circumferential grooves 10 into blocks B in four circumferential rows: axially inner blocks Bi in two rows one on each side of the tire equator C, and axially outer shoulder blocks Bo in two rows axially outside the axially inner block Bi rows. Thus, the tread pattern in this example is a block type pattern consisting of blocks B only. Aside from this block pattern, another block pattern made up of three or five or more rows of blocks B can be used. Further, the tread pattern may be a rib-block-type tread pattern made up of blocks B and at least one circumferential rib.

The blocks B are provided with zigzag sipes 21 and optionally other types of sipes.

Figure 3:
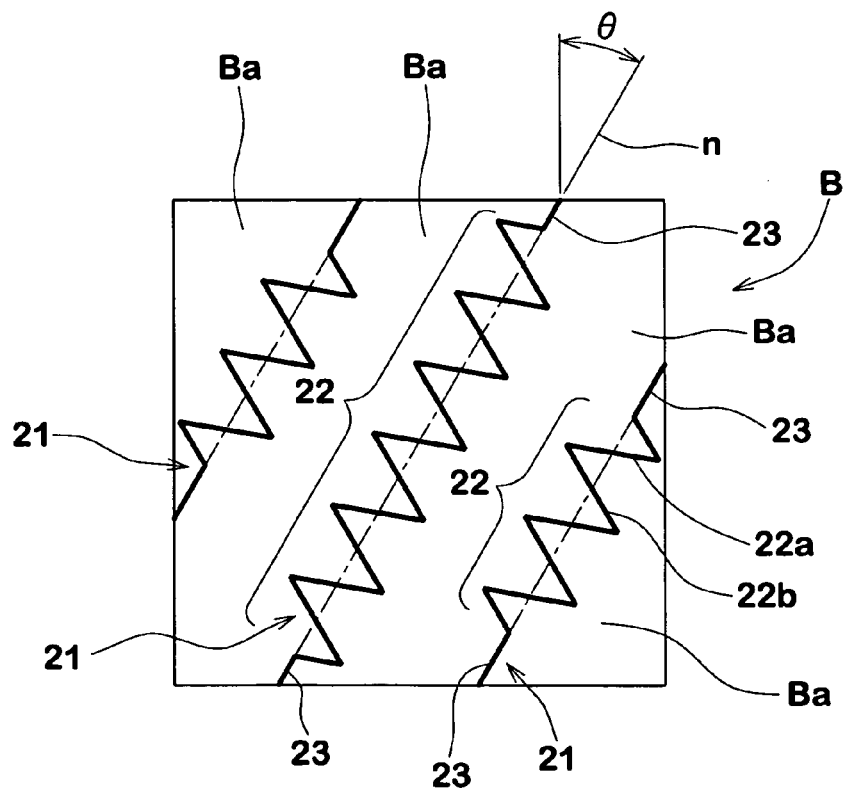
FIG. 3 is an enlarged top view of the block.
Figure 4:
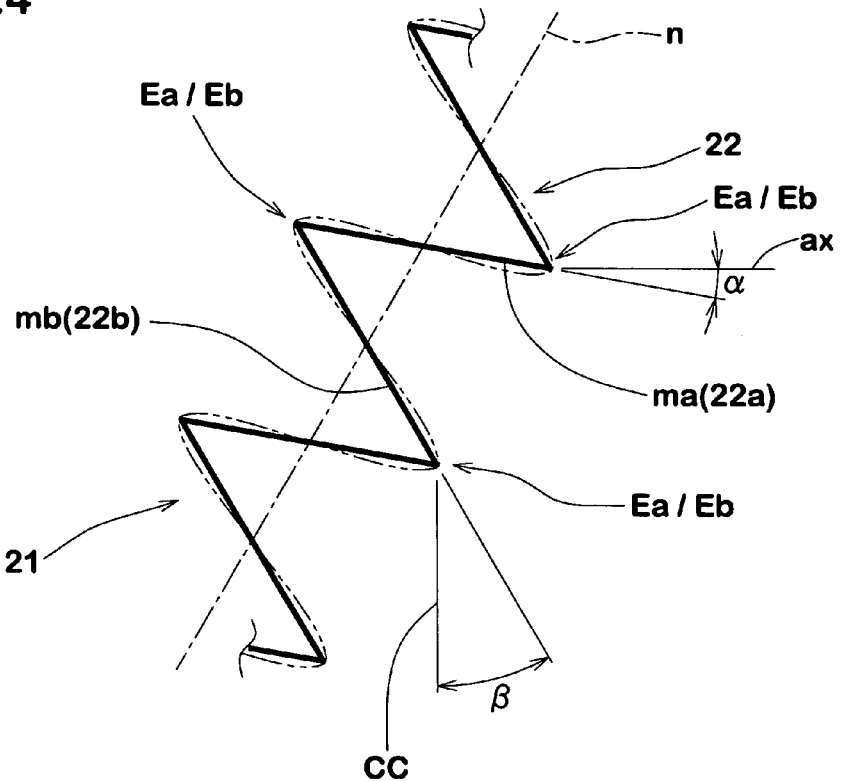
FIG. 4 is a diagram for explaining the inclination angles of the zigzag segments of the sipe.

The zigzag sipe 21 extends across the block B so that both ends are opened at the side face of the block B. In the tread face 2s, a zigzag sipe 21 has a zigzag configuration, and as shown in FIGS. 3 and 4 the center line (n) of the zigzag amplitude is inclined at an angle (theta) of from 0 to 45 degrees with respect to the tire circumferential direction. The number of the zigzag pitches or the number of zigzag cycles in a zigzag sipe 21 is preferably in the range of from 2 to 15. Thus, a block B shown in FIG. 3 for example is provided with two sipes 21 of three zigzag cycles and a central long sipe 21 of six zigzag cycles.

As to the zigzag configuration, various waveforms can be used. For example, a triangular waveform as shown in FIG. 2, a saw-tooth (right-angled triangle) waveform as shown in FIG. 6, round waveforms (for example triangular waveform whose vertexes are rounded (FIG. 7), and a saw-tooth waveform whose vertexes are rounded, a curved waveform such as sine curve (similar to FIG. 7) and the like can be used.

In this example, the sipe 21 is made up of alternating zigzag segments 22a and 22b (generically 22) each extending straight, crossing the above-mentioned amplitude center line (n) at a certain intersecting angle, and optionally a parallel-end segment 23 extending in substantially parallel with the amplitude center line (n) and formed at each end of the sipe 21.

In order to prevent the intersecting angle of the sipe with the side face of the block B from becoming too narrow and thus to improve the resistance to tear off, one or both of the parallel-end segments 23 may be omitted, or may be at a different angle from the amplitude center line (n), or may be formed in a curved line such as arc instead of the straight line.

In this example, the amplitude center line (n) is substantially straight. But, it may be a curved line such as circular arc. In such case too, the above-mentioned inclination angle (theta) is set in the above-mentioned range of from 0 to 45 degrees, namely, the tangential line to the curved line is limited to in this range.

Furthermore, each of the zigzag segments 22 is straight in this example, but it may be slightly curved.

As shown in FIG. 4, with respect to the tire circumferential direction, the segments 22b are less inclined in comparison with the segments 22a.

In consideration of the zigzag segment 22 having a curved configuration (for example as shown in imaginary line in FIG. 4), the inclination angle (alpha) of the segment 22a is defined as of the straight line (ma) drawn between both ends Ea of the segment 22a, and the inclination angle (beta) of the segment 22b is defined as of the straight line (mb) drawn between both ends Eb of the segment 22b.

In each block B, the amplitude center lines (n) of the zigzag sipes 21 are substantially parallel with each other. As a result, as shown in FIG. 3, the zigzag sipes 21 divide the block B into small block pieces Ba each being longer in the circumferential direction than the axial direction.

By setting the angle (alpha) less than 15 degrees with respect to the tire axial direction, the engaging force in the tire circumferential direction between the block pieces Ba is increased, and the apparent circumferential rigidity of the block B can be maintained high. Further, the total length of their circumferential edge components is maximized and thereby the driving force and braking force can be increased. Thus, the driving force, braking force and cornering power can be improved in a well balanced manner, and as a result it becomes possible to effectively improve on-the-ice performance. Furthermore, in the block B, as the circumferential rigidity is maintained high, uneven wear such as heel-and-toe wear can be reduced and as a result, the improved ice performance can be maintained a long period of time.

Thus, the inclination angle (alpha) is set in a range of from 0 to 15 degrees with respect to the tire axial direction (axial line ax). If the angle (alpha) is more than 15 degrees, the driving force and braking force tend to become insufficient, and further the block B is decreased in the circumferential rigidity, and as a result, it becomes difficult to improve on-the-ice performance and uneven tread wear resistance.

The inclination angle (beta) of the straight line (mb) of the circumferentially oriented segment 22b is set in a range of from 0 to 60 degrees with respect to the tire circumferential direction (circumferential line CC). If the angle (beta) is more than 60 degrees, the zigzag angle at the vertex of the zigzag (angle between the adjacent segments) becomes too small, and the rigidity and strength are decreased and the edge effect is deteriorated. In the worst case, rubber tear and crack are caused.

If the above-mentioned inclination angle (theta) of the amplitude center line (n) is more than 45 degrees, the cornering power can not be fully increased, and it becomes difficult to improve on-the-ice performance. If the inclination angle (theta) is decreased to near 0 degrees, the driving force and braking force is liable to become insufficient.

The inclination angle (theta) is thus set in the range of not more than 45 degrees, preferably not more than 30 degrees, but preferably not less than 5 degrees, more preferably not less than 15 degrees.

Figure 5:
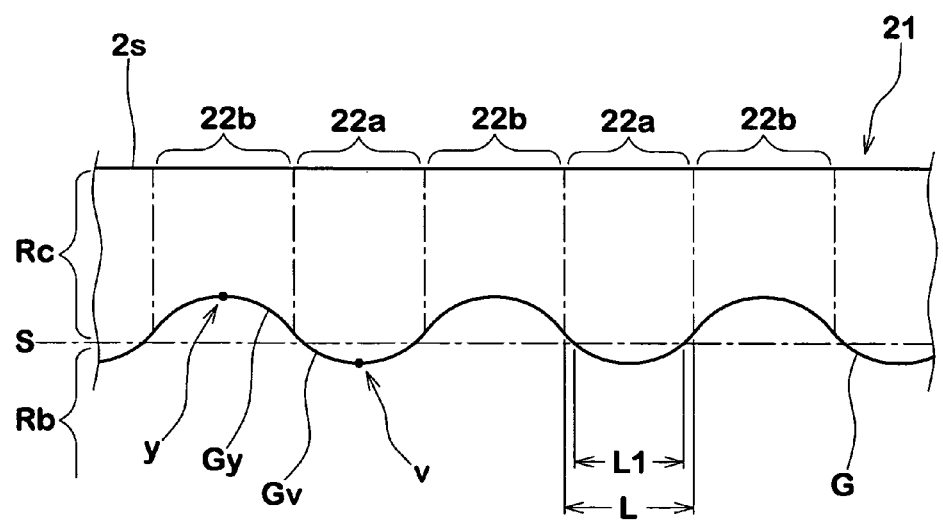
FIG. 5 is a cross sectional view of the sipe taken along the length of the sipe.

In the present invention, in order to further improve on-the-ice performance while controlling uneven tread wear, as shown in FIG. 5 which is a developed cross sectional view taken along the sipe 21, the axially oriented segments 22a or alternatively the circumferentially oriented segments 22b are formed deeper than the level of the above-mentioned boundary S between the cap tread rubber Rc and base tread rubber Rb. In other words, the bottom G thereof extends beyond the level of the boundary S. On the other hand, the remaining segments are accordingly formed shallower than the boundary level.

Specifically, in this example, the axially oriented segments 22a are made deeper than the boundary level in order to relatively increase the axial edge effect to thereby further increase the driving force and braking force.

In the example shown in FIG. 5, the bottom G of the sipe 21 is waved with a gentle curve, and thereby, it consists of alternating valley portions Gv deeper than the boundary level and mountain portions Gy shallower than the boundary level. The wave of the waved bottom G is synchronized with the zigzag of the zigzag segments 22. In other words, the valley portions Gv deeper than the boundary level is formed within the range of the segment 22a, and the wave pitch lengths are made equal to the respective zigzag pitch lengths. In each of the axially oriented segments 22a, the length L1 of the valley portion Gv (namely, a part deeper than the boundary level) is preferably set in a range of from 60 to 100% of the overall length L of the segment 22a, when measured along the longitudinal direction of the segment 22a. The deepest point (v) of the valley portion Gv is formed at the midway point of the segment 22a, and the shallowest point (y) of the mountain portion Gy is also formed at the midway point of the segment 22b.

By arranging the zigzag sipes 21 as explained above, the edge effect in the axial direction can be improved while preventing the decrease in the block rigidity due to the existence of the sipes 21. Thus uneven wear and ice performance can be further improved.

In each of the blocks B, as described above, all the sipes 21 are inclined to the same direction in parallel with each other. In the example shown in FIG. 2, the sipes 21 of all the blocks B are inclined to the same direction and further at the same inclination angle (theta). It is however also possible that, as shown in FIG. 6, the blocks have different inclinations (different angles (theta)). In this case, the difference in the inclination angles (theta) between the adjacent blocks is preferably set in the range of from 5 to 10 degrees.

Figure 7:
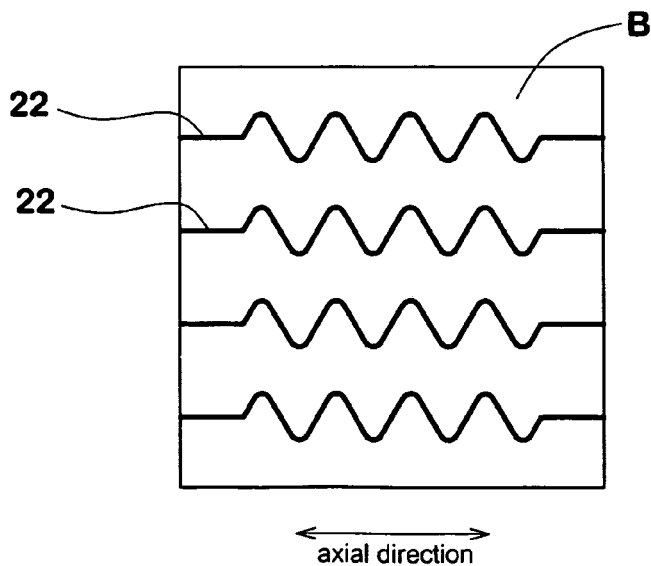
FIG. 7 is a top view of a tread block provided with axially oriented zigzag sipes only which is combinable with the block provided with circumferentially oriented zigzag sipes.

In connection with the above-mentioned optional other types of sipes, although the above-described examples are provided with the sipes 21 only, this not necessarily mean that the use of other types of sipes in combination with the above-mentioned zigzag sipes 21 is excluded. For example, an axially oriented zigzag sipe 22 as shown in FIG. 7, a straight sipe, a sipe having a closed end and an open end, a sipe having closed ends, etc., may be used in combination with the sipes 21. Further, as the alternative to the valley portions Gv formed in the axially oriented segments 22a, zigzag sipes 21 in which the valley portions Gv are respectively formed within the circumferentially oriented segments 22b can be used in combination. Such sipes 21 increase the circumferential edge effect and thereby on-the-ice steering stability can be improved.

Comparison Tests

Radial tires of size 195/65R15 (wheel rim size 15×6JJ) for passenger cars having the simple rectangular-block tread pattern shown in FIG. 2 provided with sipes having specifications given in Table 1 were made and tested for on-the-ice performance and uneven tread wear resistance.

1) On-the-Ice Tire Performance Test

A Japanese 2000cc FR passenger car provided on all the four wheels with test tires (tire pressure 220 kPa) was run on an icy road in an indoor tire test course, and four-wheel lock braking was made at a running speed of 40 km/hr, and the braking distance, namely, running distance to stop was measured.

2) Uneven Tread Wear Resistance Test

Using the above-mentioned test car, after running for 2000 km on a dry asphalt paved road, heel-and-toe wear was measured as the difference in the block height between the toe-side edge and heel-side edge caused by uneven wear of the block.

AS shown in Table 1, it was confirmed that both of the braking distance and heel-and-toe wear can be improved.

TABLE 1

| Tire | Ref. | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| Zigzag sipe | | | | | | | | | | | | |
| Number (per block) | 4 | 3 | 3 | 3 | 3 | 3 | 3 | 3 | 3 | 3 | 3 | 3 |
| Number of zigzag cycles | 4 | 4 | 4 | 4 | 4 | 4 | 4 | 4 | 4 | 4 | 4 | 4 |
| Zigzag amplitude (mm) | 4 | 4 | 4 | 4 | 4 | 4 | 4 | 4 | 4 | 4 | 4 | 4 |
| Angle theta (deg.) | 90 | 0 | 5 | 15 | 30 | 45 | 0/5/45 *1 | 5/15/30 *1 | 10/15/30 *1 | 15/30/45 *1 | 0/30/45 *1 | 5/10/45 *1 |
| Angle alpha (deg.) | 10 | 10 | 10 | 10 | 10 | 10 | 10 | 10 | 10 | 10 | 10 | 10 |
| Angle beta (deg.) | 40 | 40 | 40 | 40 | 40 | 40 | 40 | 40 | 40 | 40 | 40 | 40 |
| Bottom | flat | waved | waved | waved | waved | waved | waved | waved | waved | waved | waved | waved |
| Braking distance (m) | 50 | 49.5 | 49.2 | 48.9 | 48.7 | 48.3 | 49.3 | 48.9 | 48.6 | 47.5 | 48 | 48.3 |
| Heel-and-toe wear (mm) | 3 | 0 | 0 | 1 | 2 | 2 | 0 | 0 | 0 | 1 | 1 | 1 |

*1 Three kinds at blocks having the described three angles (theta) were arranged such that any two of the adjacent blocks had different angles.
*2 The wavy configuration of the sipe bottom was in sync with the zigzag configuration of the sipe on the tread face.

The invention claimed is:

1. A pneumatic tire comprising
a tread portion provided in a tread face thereof with tread elements each provided with at least one zigzag sipe,
a cap tread rubber defining said tread face, and
a base tread rubber disposed radially inside the cap tread rubber, forming a boundary therebetween,
the zigzag sipe comprising zigzag segments which are alternating circumferentially-oriented segments and axially-oriented segments,
an amplitude center line of zigzag of the zigzag sipe being inclined at an angle (theta) of from 0 to 45 degrees with respect to the tire circumferential direction, and
the zigzag sipe having a bottom including alternating deep parts and shallow parts in comparison with the level of said boundary, wherein
the axially-oriented segment has an angle (alpha) in a range of from 0 to 15 degrees with respect to the tire axial direction.
the deep parts are respectively located in the axially-oriented segments, and the shallow parts are respectively located in the circumferentially-oriented segments, and
in the axially-oriented segments, the length of the deep part in each segment is in a range of from 60 to 100 % of the length of the segment.

2. The pneumatic tire according to claim 1, wherein the bottom of the zigzag sipe is waved with a curved line along the length of the sipe.

3. The pneumatic tire according to claim 1, wherein the zigzag sipes of all the tread elements are inclined to the same direction.

4. The pneumatic tire according to claim 1, wherein the zigzag sipes of all the tread elements have the amplitude center lines of the same inclination angle (theta).

5. The pneumatic tire according to claim 1, wherein the tread elements include tread elements each with a plurality of the zigzag sipes, and
in each said element with a plurality of the zigzag sipes, the amplitude center lines of the zigzag sipes are inclined at the same inclination angle (theta) so that each of the tread elements each with a plurality of the zigzag sipes has one inclination angle (theta).

6. The pneumatic tire according to claim 5, wherein the tread elements each with a plurality of the zigzag sipes have at least two different inclination angles (theta), and
the difference in the inclination angle (theta) between the adjacent tread elements is in a range of from 5 to 10 degrees.

7. The pneumatic tire of claim 1, wherein the inclination angle (beta) of the circumferentially oriented segment is in a range of 0 to 60 degrees with respect to the tire circumferential direction.

8. A pneumatic tire comprising:
a tread portion provided in a tread face thereof with tread elements each provided with at least one zigzag sipe,
a cap tread rubber defining said tread face, and
a base tread rubber disposed radially inside the cap tread rubber, forming a boundary therebetween,
the zigzag sipe comprising zigzag segments which are alternating circumferentially-oriented segments and axially-oriented segments,
an amplitude center line of zigzag of the zigzag sipe being inclined at an angle (theta) of from 0 to 45 degrees with respect to the tire circumferential direction, and
the zigzag sipe having a bottom including alternating deep parts and shallow parts in comparison with the level of said boundary, wherein
the axially oriented segment has an angle (alpha) in a range of from 0 to 15 degrees with respect to the tire axial direction,
the deep parts are respectively located in the circumferentially-oriented segments, and the shallow parts are respectively located in the axially-oriented segments, and
in the circumferentially-oriented segments, the length of the deep part in each segment is in a range of from 60 to 100 % of the length of the segment.

9. The pneumatic tire according to claim 8, wherein the bottom of the zigzag sipe is waved with a curved line along the length of the sipe.

10. The pneumatic tire according to claim 8, wherein the zigzag sipes of all the tread elements are inclined to the same direction.

11. The pneumatic tire according to claim 8, wherein the zigzag sipes of all the tread elements have the amplitude center lines of the same inclination angle (theta).

12. The pneumatic tire according to claim 8, wherein the tread elements include tread elements each with a plurality of the zigzag sipes, and
in each said element with a plurality of the zigzag sipes, the amplitude center lines of the zigzag sipes are inclined at the same inclination angle (theta) so that each of the tread elements each with a plurality of the zigzag sipes has one inclination angle (theta).

13. The pneumatic tire according to claim 8, wherein the tread elements each with a plurality of the zigzag sipes have at least two different inclination angles (theta), and
the difference in the inclination angle (theta) between the adjacent tread elements is in a range of from 5 to 10 degrees.

14. The pneumatic tire of claim 8, wherein the inclination angle (beta) of the circumferentially oriented segment is in a range of 0 to 60 degrees with respect to the tire circumferential direction.

* * * * *